(12) United States Patent
Shields et al.

(10) Patent No.: US 7,007,438 B1
(45) Date of Patent: Mar. 7, 2006

(54) CROSSARM SYSTEMS AND METHODS

(75) Inventors: Scott D. Shields, Bellingham, WA (US); John R. Ferlin, Bellingham, WA (US); John L. Clark, Ferndale, WA (US)

(73) Assignee: Brooks Manufacturing Co., Bellingham, WA (US)

( * ) Notice: Subject to any disclaimer, the term of this patent is extended or adjusted under 35 U.S.C. 154(b) by 0 days.

(21) Appl. No.: 10/254,412

(22) Filed: Sep. 24, 2002

(51) Int. Cl.
E04C 3/30 (2006.01)

(52) U.S. Cl. .................... 52/736.2; 52/712; 52/745.19; 403/283; 29/897; 29/897.3; 29/897.31

(58) Field of Classification Search ................ 52/697, 52/721, 40, 712, 736.2, 745.19, 745.17, 745.18, 52/742; 403/283, 405.1, DIG. 15; 411/466, 411/461, 470, 912, 221; 29/897, 897.3, 897.31, 29/897.312, 897.35, 428
See application file for complete search history.

(56) References Cited

U.S. PATENT DOCUMENTS

| | | | | |
|---|---|---|---|---|
| 839,272 | A | * | 12/1906 | Crow .......................... 52/697 |
| 1,815,598 | A | * | 7/1931 | Stroup ..................... 174/45 R |
| 2,273,507 | A | | 2/1942 | Beegle |
| 3,241,424 | A | | 3/1966 | Moehlenpah et al. |
| 3,509,678 | A | * | 5/1970 | Dake ......................... 52/736.2 |
| 3,555,747 | A | * | 1/1971 | Taylor ........................... 52/40 |
| 3,603,717 | A | * | 9/1971 | Scott ........................ 174/45 R |
| 3,649,740 | A | * | 3/1972 | Boyer et al. ................... 174/43 |
| 3,653,622 | A | * | 4/1972 | Farmer ........................ 211/107 |
| 3,884,442 | A | * | 5/1975 | Breeden et al. .............. 211/107 |
| 3,892,160 | A | * | 7/1975 | Jureit et al. .................. 411/468 |
| 3,910,153 | A | * | 10/1975 | Jureit ........................... 411/466 |
| 3,911,548 | A | * | 10/1975 | Perry ...................... 29/402.12 |
| 4,127,739 | A | * | 11/1978 | Farmer ...................... 174/45 R |
| 4,194,080 | A | * | 3/1980 | Meisberger ............... 174/45 R |
| 4,262,047 | A | * | 4/1981 | Barnett et al. ................. 428/73 |
| 4,418,509 | A | * | 12/1983 | Moyer et al. .................. 52/693 |
| 4,615,154 | A | * | 10/1986 | Troutner ......................... 52/40 |
| 4,654,540 | A | * | 3/1987 | Bridges ....................... 307/126 |
| 4,682,747 | A | * | 7/1987 | King et al. ................. 248/68.1 |
| 4,728,749 | A | * | 3/1988 | Knight ...................... 174/45 R |
| 4,742,661 | A | * | 5/1988 | Burtelson .................... 52/697 |
| 5,116,179 | A | | 5/1992 | Matlock |
| 5,551,819 | A | * | 9/1996 | Stern .......................... 411/466 |
| 5,605,017 | A | * | 2/1997 | Fingerson et al. .............. 52/40 |
| 5,772,158 | A | * | 6/1998 | Blanding ..................... 248/49 |
| 5,775,035 | A | * | 7/1998 | Papin .......................... 52/100 |
| 6,066,048 | A | * | 5/2000 | Lees .......................... 470/110 |
| 6,176,058 | B1 | * | 1/2001 | Trarup ......................... 52/514 |
| 6,229,086 | B1 | * | 5/2001 | Blanding ..................... 174/43 |

(Continued)

*Primary Examiner*—Anthony D. Barfield
(74) *Attorney, Agent, or Firm*—Michael R. Schacht; Schacht Law Office, Inc.

(57) ABSTRACT

A crossarm system adapted to support power lines from a vertical pole. The crossarm system comprises a wooden crossarm member and first and second nail end plates. The wooden crossarm member defines upper, lower, inner, and outer surfaces and first and second end surfaces, a main bore, a plurality of pin bores, and at least one brace bore. Each nail end plate comprises a plate member defining an inner surface and an outer surface and a plurality of nail projections extending from the inner surface of the plate member. Each nail projection defines a width dimension. In use, the first and second nail end plates are displaced towards the first and second end surfaces, respectively, such that the nail projections enter the wooden crossarm member. The nail projections are arranged such that the width dimensions substantially prevent splitting of the ends of the crossarm member.

5 Claims, 4 Drawing Sheets

U.S. PATENT DOCUMENTS

| | | | |
|---|---|---|---|
| 6,347,488 B1 * | 2/2002 | Koye | 52/40 |
| 6,367,226 B1 * | 4/2002 | Shauf et al. | 52/736.2 |
| 6,409,135 B1 * | 6/2002 | Roberts | 248/300 |
| 6,609,345 B1 * | 8/2003 | Schauf et al. | 52/736.2 |
| 6,626,406 B1 * | 9/2003 | Olson, Jr. | 248/219.3 |

* cited by examiner

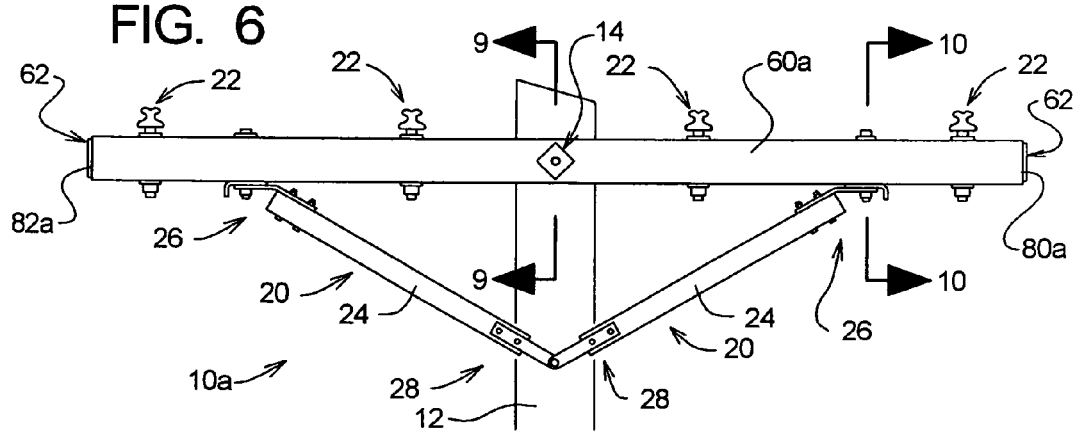
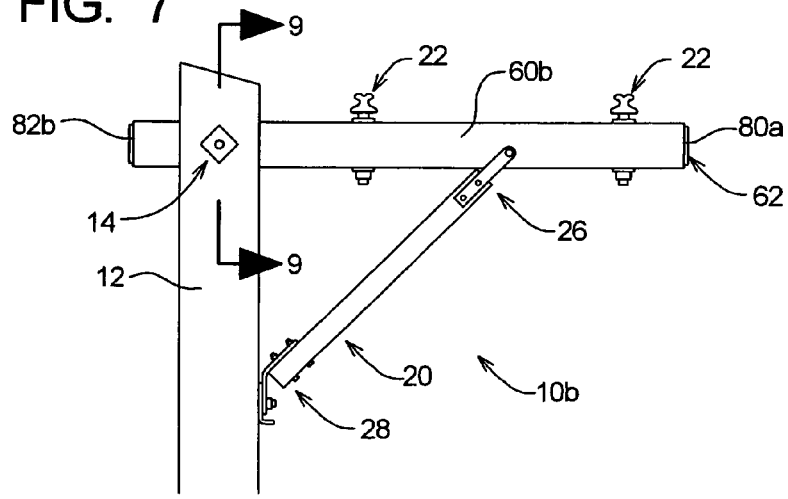

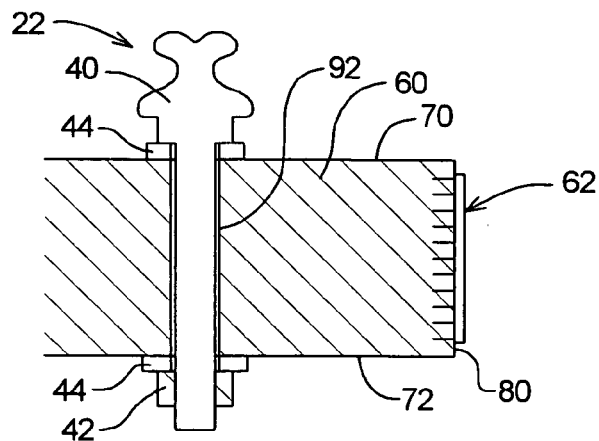
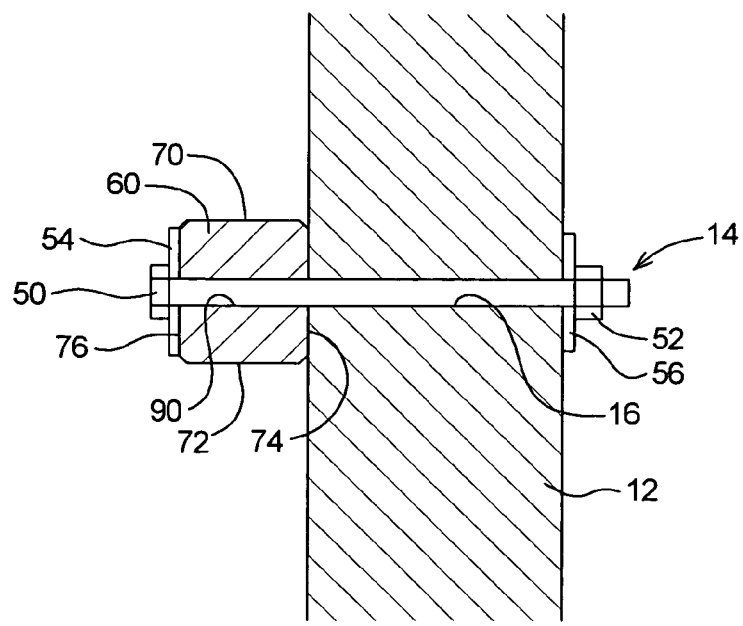
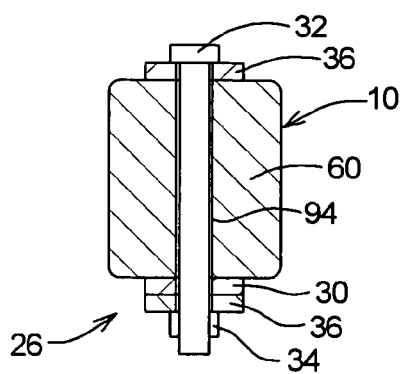

CROSSARM SYSTEMS AND METHODS

TECHNICAL FIELD

The present invention relates to crossarm systems and, more particularly, to wood crossarms adapted to suspend power lines from power poles.

BACKGROUND OF THE INVENTION

A crossarm is a rigid member that is secured to a vertical pole for the purpose of supporting one or more power lines above the ground. Typically, the vertical pole is a wooden pole. The crossarm can be made of many materials, but crossarms made of treated wood have the requisite structural characteristics, are relatively inexpensive, and can last up to 50 years or more when properly installed and maintained. The present invention relates to wood crossarms.

A first portion of a crossarm is typically secured to a first location on the pole by a crossarm bolt that extends through the pole and the crossarm. Many crossarms are also supported at a second portion, and often a third portion, by one or more brace assemblies. The brace assemblies extend between the pole at a second location below the first location and the second and/or third portions of the crossarm. Whether or not brace assemblies are used, the resulting structure is engineered to allow the loads of power lines and the like to be suspended from the crossarm.

As generally discussed above, treated wood has desirable cost and structural properties and, overall, is preferred for use as a crossarm. The term "treated wood" as used herein refers to a wooden member that has been treated with a preservative material. The preservative material typically includes pesticides such as insecticides, fungicides, and the like that discourage the growth of biological organisms that would otherwise degrade the structural properties of wood over time. Typically, the preservative material uses oil or water as a vehicle for carrying the pesticides into the wooden member.

In particular, a wooden member is milled into the desired shape of a crossarm. The surface of the wooden member is then incised to allow for improved penetration of the preservative into the wood. The wooden member is then immersed in the preservative material in a pressure tank. The tank is pressurized to force the preservative material into the wooden member to obtain the treated wood crossarm. Depending on the specie of wood, the preservative material may or may not penetrate completely through the wooden member; the preservative material may only extend into a boundary region that is protected by the preservative material, leaving an interior region that is unprotected by pesticides.

One cause of the premature failure of wooden crossarm members relates to splitting of the ends of the wooden member. In wood crossarms that are not totally penetrated by pesticides, such splitting allows the untreated interior region of the wooden member to be exposed to biological organisms that cause it to degrade. Splitting also adversely affects the ability of a wooden crossarm to bear the loads placed thereon by power lines and the like. In either case, splitting of the crossarm member can result in failure of the crossarm system.

The need thus exists for crossarm systems and methods that are less susceptible to splitting and the system failures associated therewith.

PRIOR ART

The Applicant is aware of the use of nail end plates with railroad ties, and an example of a nail end plate adapted for use with a railroad tie is depicted in FIG. 1 of the present invention.

U.S. Pat. Nos. 5,116,179 to Matlock and 5,551,819 to Stern disclose nail end plates for use in railroad ties; the Stern patent specifically discusses railroad ties and generally indicates that this nail end plate could be used on other wood products but does not specifically mention any other types of products.

The nail end plate of the Stern patent employs a field of intermediate teeth formed in a conventional manner and edge teeth formed along at least two and preferably four opposing edges of the nail end plate. The edge teeth are formed such that the wide surfaces defined thereby oppose each other when they penetrate the wood. Before the teeth are punched or forced from the plate, the edge teeth extend completely outwardly from the plate.

The Stern patent further discloses as prior art the use of an "S-iron" and a "C-iron" that are driven into the end of a railroad tie to reduce splitting thereof.

The nail end plate described in the Matlock patent employs teeth or nail portions that are arranged in adjacent laterally-spaced rows, with alternating teeth in each row being laterally offset from adjacent teeth within the row. The teeth are also defined as having a shank portion and a tip portion, with the shank portion being V-shaped in cross-section.

U.S. Pat. No. 2,273,507 to Beegle also relates to a device for reducing the splitting of railroad ties, but this device is not a nail end plate as described in the Matlock and Stern patents. The Beegle patent discloses an anti-splitting device similar the "S-iron" and C'iron" devices of the Stern patent, but the Beegle device employs a generally U-shaped cross-section.

The Applicant is also aware of the use of nail plates to join two pieces of wood together. As examples, U.S. Pat. Nos. 3,910,153 to Jureit and 3,892,160 to Jureit et al. disclose nail plates engineered for forming joints between the wooden members used to form a truss.

SUMMARY OF THE INVENTION

The present invention may be embodied as a crossarm system adapted to support power lines from a vertical pole or a method of making such a crossarm system. The crossarm system comprises a wooden crossarm member and first and second nail end plates. The wooden crossarm member defines upper, lower, inner, and outer surfaces and first and second end surfaces, a main bore, a plurality of pin bores, and at least one brace bore. Each nail end plate comprises a plate member defining an inner surface and an outer surface and a plurality of nail projections extending from the inner surface of the plate member. Each nail projection defines a width dimension. In use, the first and second nail end plates are displaced towards the first and second end surfaces, respectively, such that the nail projections enter the wooden crossarm member. The nail projections are arranged such that the width dimensions substantially prevent splitting of the ends of the crossarm member.

BRIEF DESCRIPTION OF THE DRAWINGS

FIG. 6 is a front elevation view of a first embodiment of a crossarm system of the present invention;

FIG. 7 is a front elevation view of a second embodiment of a crossarm system of the present invention;

FIG. 8 is a section view of the crossarm systems of FIGS. 6 and 7 depicting insulator pin assemblies supported by these crossarm systems;

FIG. 9 is a section view taken along lines 9—9 in FIGS. 6 and 7; and

FIG. 10 is a section view taken along lines 10—10 in FIG. 6.

DETAILED DESCRIPTION OF THE INVENTION

Figure 1:
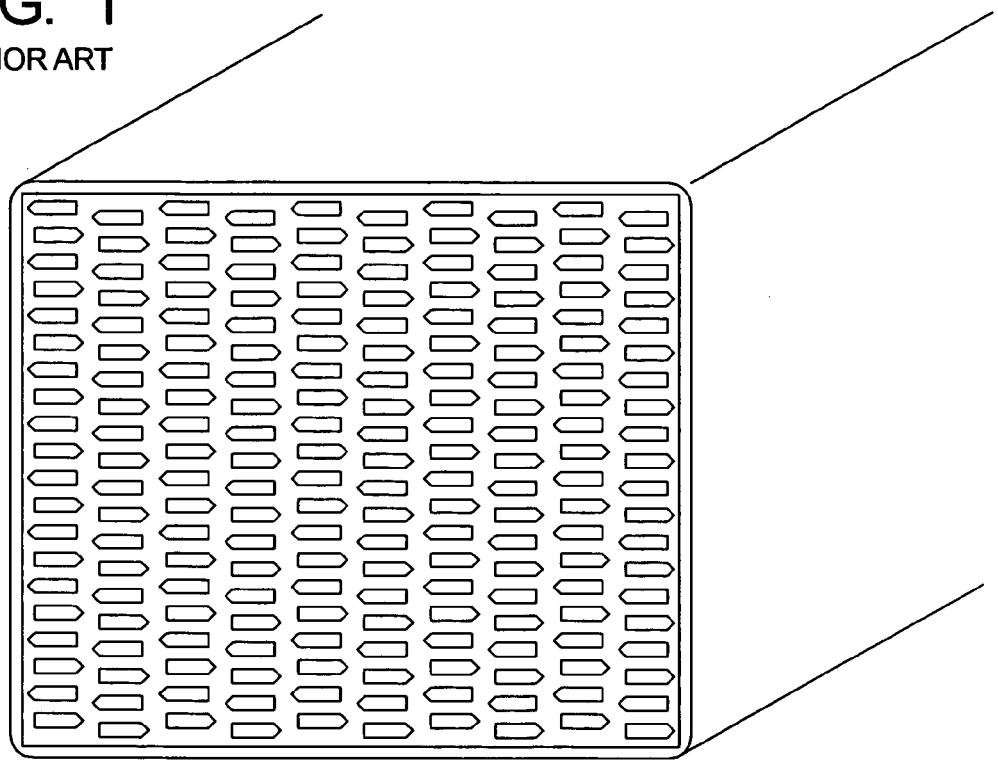
FIG. 1 depicts a prior art nail plate used with railroad ties.

Referring now to the drawing, identified by reference character 10 in FIGS. 6 and 7 are two exemplary crossarm systems constructed in accordance with, and embodying, the principles of the present invention. FIG. 6 illustrates first embodiment of a crossarm system 10*a*, while FIG. 7 illustrates a second embodiment of a crossarm system 10*b*.

The crossarm systems 10 are adapted to be attached to a pole 12. A crossarm bolt assembly 14 extending through a crossarm bore 16 in the pole 12 forms the main point of attachment between the crossarm system and the pole 12 (FIG. 9). The crossarm systems 10 are typically additionally braced by one or more brace assemblies 20 extending between the crossarm systems 10 and the pole 12. Each of the crossarm systems 10 supports a plurality of insulator pin assemblies 22 that are in turn used to support power lines (not shown).

The crossarm bolt assembly 12, brace assemblies 20, and insulator pin assemblies 22 are or may be conventional. Examples of these assemblies 12, 20, and 22 will be described herein to provide a full understanding of the benefits yielded by the present invention; however, the details of these assemblies 12, 20, and 22 are not important to any given implementation of the present invention, and other assemblies with similar structural characteristics may be used instead. In addition, the brace assemblies 20 may be omitted in a braceless crossarm system.

Referring initially to the brace assemblies 20, the first exemplary crossarm system 10*a* employs two brace assemblies 20 and the second exemplary crossarm system employs a single brace assembly 20. The brace assemblies 20 each comprise a brace member 24, an upper bracket assembly 26, and a lower bracket assembly 28. The bracket assemblies can take different forms, and only the upper bracket assemblies 26 of the first crossarm system 10*a* will be described in detail herein. As shown in FIG. 10, the upper bracket assembly 26 of the crossarm system 10*a* comprises a bracket member 30, a bracket bolt 32, a bracket nut 34, and a bracket washer 36.

The first crossarm system 10*a* employs four insulator pin assemblies 22, while the second crossarm system 10*b* employs two insulator pin assemblies 22. More or fewer insulator pin assemblies 22 may be used in a given circumstance, but the principles of the present invention should be clear with reference to the crossarm systems 10*a* and 10*b*. Each of the exemplary insulator pin assemblies 22 comprises an insulator pin 40, an insulator pin nut 42, and a pair of insulator washers 44, but other configurations of insulator pin assemblies may be used in place of the insulator pin assemblies shown.

The crossarm bolt assembly 50 of both of the crossarm systems 10*a* and 10*b* comprises a crossarm bolt 50, a crossarm nut 52, a crossarm plate 54, and an anchor plate 56. Other configurations of crossarm bolt assemblies may be used.

As shown in FIGS. 6 and 7, the crossarm system 10 of the present invention comprises a crossarm member 60 and a pair of nail end plates 62. In particular, FIG. 6 depicts a first embodiment of a crossarm system 10*a* comprising a crossarm member 60*a*, while FIG. 7 depicts a second embodiment of a crossarm system 10*b* comprising a crossarm member 60*b*. The crossarm members 60*a* and 60*b* are treated wooden members defining an upper surface 70, a lower surface 72, an inside surface 74, an outside surface 76, a first end surface 80, and a second end surface 82 (see FIG. 9). The crossarm members 60*a* and 60*b* used by the crossarm systems 10*a* and 10*b* may be identical or may be engineered to have different lengths or cross-sectional areas. The exemplary crossarm members 60*a* and 60*b* have the same cross-sectional area but differ in length.

In the following discussion, the terms "vertical" and "horizontal" refer to directions relative to the crossarm member 60 when mounted to a pole 12 under normal conditions. Implicit in these definitions is the term "substantially"; in particular, during normal use the end surfaces 80 and 82 can be within ten degrees of vertical, and the upper and lower surfaces 70 and 72 can be within ten degrees of horizontal.

To accommodate the crossarm bolt assembly 14, insulator pin assemblies 22, and upper bracket assemblies 26, a number of bores are formed in the crossarm member 60. In particular, a horizontal main bore 90 extends between the inside and outside surfaces 74 and 76. The crossarm bolt 50 extends through the main bore 90 as shown in FIG. 9. A plurality of vertical pin bores 92 extend between the upper and lower surfaces 70 and 72. The insulator pins 40 extend through the pin bores 92. A brace bore 94 is formed for each upper bracket assembly 26. The brace bores 94 may be horizontal or vertical depending upon the details of the bracket member 30. FIG. 10 depicts the vertical brace bore 94 formed in the example crossarm member 60*a* depicted in FIG. 6. The bracket bolts 32 extend through the brace bores 94.

Structural failure of wooden members made from a solid piece of wood, such as the crossarm member 60, is often caused by splitting of the wooden member along the grain. Splits in a wooden member tend to begin as small cracks in the end surfaces 80 and/or 82 that progressively increase in size as the wood endures wet and dry cycles and/or the wood is subjected to external loads.

Splitting can result in catastrophic structural failure of the wooden member. Splitting of the wood also facilitates deterioration of wood by exposing the untreated interior of the wooden member to the elements.

The bores 90, 92, and 94 make the crossarm member 60 especially susceptible to splitting and the problems associated therewith. In particular, the bores create weak points in the crossarm member 60 by damaging the wood fibers and reducing the cross-sectional area of the wooden member. In addition, the bores 90, 92, and 94 receive bolts that transfer external loads to the wooden member; these loads introduce stresses into the crossarm member 60 at the points where the member 60 is the weakest. The bores pin bores 92 are most problematic because, as shown in FIG. 8, one of the pin bores 92 is typically the bore formed in the crossarm member 60 closest to the end surfaces 80 and 82.

Figure 3:
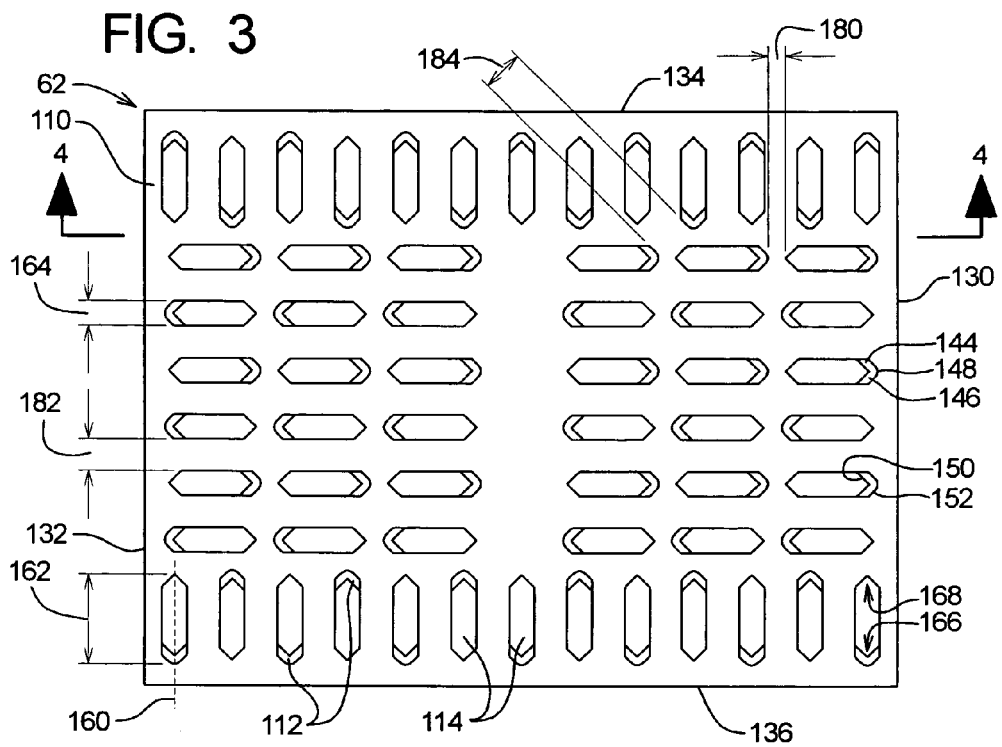
FIG. 3 is a rear elevation view of a first embodiment of a nail end plate that may be used by the crossarm system of FIG. 2.
Figure 4:
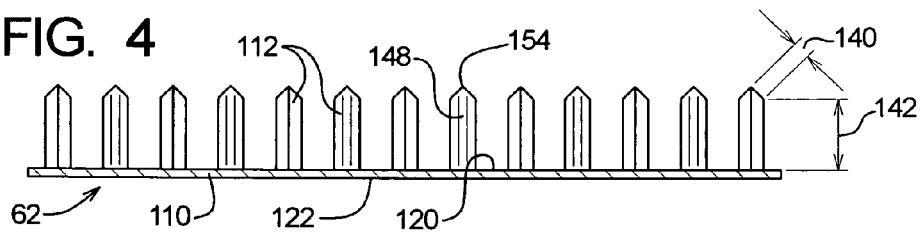
FIG. 4 is a side elevation view of the nail end plate of FIG. 3.

The nail end plates 62 are secured to the crossarm member end surfaces 80 and 82 to reduce splitting of the crossarm member 60. As shown in FIGS. 3 and 4, the nail end plates 62 comprise a plate member 110 and a plurality of nail projections 112. In use, the nail projections 112 are driven into the crossarm member end surfaces 80 and 82, and the plate member 110 forms a structural base that maintains the nail projections 112 in a predetermined relationship with each other. The nail projections 112 engage spaced apart portions of the crossarm member 60 in a manner that prevents these portions from moving relative to each other. The nail end plates 62 thus mechanically engage the crossarm member 60 to prevent small cracks from developing into splits that could result in failure of the crossarm member 60.

The structure of the preferred nail end plates 62 will now be described in further detail with reference to FIGS. 3 and 4. The nail end plates 62 define plate openings 114 that are associated with each of the nail projections 112. The nail end plates 62 are preferably formed from a flat blank that is stamped with a die (not shown) to obtain the nail projections 112. The blank, and the nail end plates 62 formed therefrom, are preferably made of a rigid material such as steel. Other materials with similar structural characteristics may also be used. If steel is used, the nail end plate 62 may be made of galvanized steel or stainless steel or may be coated to resist corrosion.

The stamping process simultaneously cuts and bends material from the blank, forming the nail projections 112 out of the material removed from the blank and, as a byproduct, forming the plate openings 114. The die used to form the nail end plates 62 determines the sizes, shapes, and locations of the nail projections 112. The stamping process is conventional and will not be described herein in further detail. The die is made in a conventional manner, and this discussion of the nail end plates 62 will instruct one of ordinary skill in the art how to make use an appropriate die.

Although the nail end plates 62 are preferably diestamped, other methods of forming the nail end plates 62, such as casting, molding, milling, or the like may be used.

The plate member 110 defines a plate inner surface 120, a plate outer surface 122, and first, second, third, and fourth plate edges 130, 132, 134, and 136. The plate member 110 is substantially rectangular, but other shapes may be used. A thickness of the plate member 110 is defined as the distance between the plate inner and outer surfaces 120 and 122. A height of the plate member 110 is defined as a length of the first and second edges 130 and 132, while a width of the plate member 110 is defined as a length of the third and fourth edges 134 and 136.

The nail projections 112 extend at substantially a right angle from the inner surface 120 of the plate member 112. When viewed from the side as shown in FIG. 4, the nail projections 112 define a tip portion 140 and a shaft portion 142. The tip portion 140 is generally triangular in shape, while the shaft portion 142 is generally rectangular in shape. When viewed from the end as perhaps best shown in FIG. 3, the nail projections 112 further define first and second side portions 144 and 146 that extend from a ridge portion 148. The side portions 144 and 146 are flat and extend from each other at an interior angle of less than 180°. The surfaces of the nail projections are identified in FIG. 3 as a face surface 150 arranged towards the plate opening 114 associated therewith and a back surface 152. The face surface 150 is arranged towards the interior angle between the side portions 144 and 146. A tip of the nail projections 112 is identified by reference character 154, and a base of the nail projections 112 is identified by reference character 156.

The plate openings 114 will now be described in further detail with respect to FIG. 3. As generally discussed above, the plate openings 114 are primarily a byproduct of a cost-effective and preferred method of forming the nail end plates 62. However, the plate openings 114 will be described in further detail herein to define further the relative arrangements and groupings of the nail projections 112.

In particular, the plate openings 114 each define a projection axis 162 that is parallel to a length dimension 162 and perpendicular to a width dimension 164 of the plate openings 114. The plate openings 114 further define a base end 166 adjacent to the nail projection 112 associated therewith and a tip end 168 distal from the base end 166.

The face surface 150 of the nail projections 112 is arranged towards the plate opening 114 associated therewith. The face surfaces 150 and back surfaces 152 define a width dimension of the projections 114 (perpendicular to the projection axis 162). The dimensions of the side portions 146 and 148 and interior angle between these portions 146 and 148 define a depth dimension of the projections 114 (parallel to the projection axis 162). The width dimension is larger than the depth dimension, so each individual nail projection 114 exposes a greater surface area to the wood in the width dimension than in the depth dimension. The width dimension presents greater resistance to relative movement between the wood and the nail projection. The projection axes 162 thus correspond to the orientation of the nail projection 112 that provides the greatest resistance to movement of the wood relative to the nail projection.

Figure 2:
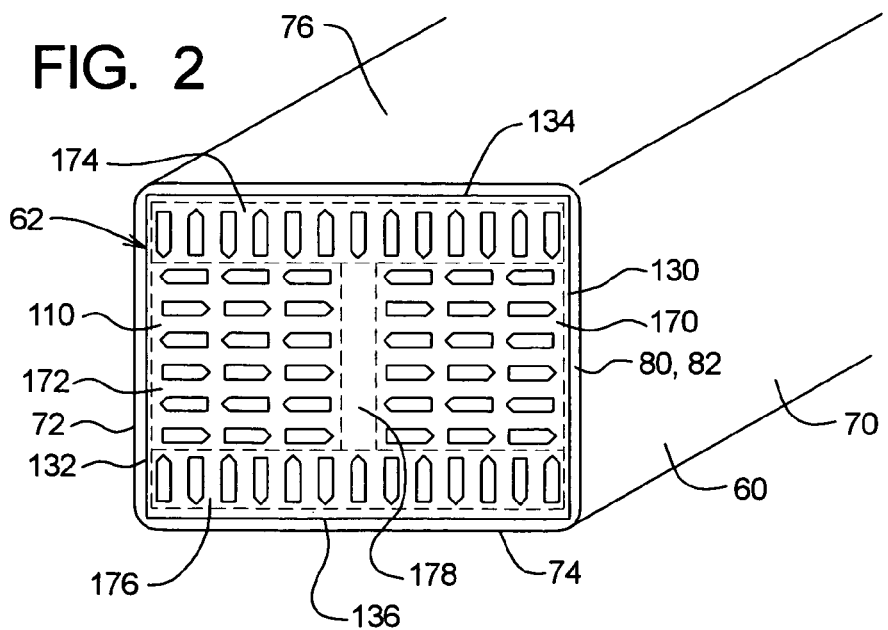
FIG. 2 is a partial perspective view of crossarm system constructed in accordance with, and embodying, the principles of the present invention.

Referring now to FIG. 2, as shown therein the nail projections are arranged in discrete arrays. These arrays will be referred to as a first array 170, a second array 172, a third array 174, and a fourth array 176. In the exemplary nail end plates 62, a gap region 178 is defined. The gap region 178 does not contain any nail projections and is substantially surrounded by the arrays 170–176.

The projection axes 162 of the nail projections 112 within each of the arrays 170–176 are aligned with each other. The arrays themselves are thus directional in that the nail projections 112 within the arrays are grouped to accumulate the increased resistance to wood movement provided by the face and back surfaces 150 and 152.

FIG. 2 thus shows that the projection axes of the first and second arrays 170 and 172 are aligned with each other, the projection axes of the third and fourth arrays 174 and 176 are aligned with each other, and the projection axes of the first and second arrays 170 and 172 are perpendicular to the projection axes of the third and fourth arrays 174 and 176.

FIG. 2 also shows that the nail end plates 62 are attached to the end surfaces 80, 82 of the crossarm member 60. This attachment is formed by displacing the nail end plates 62 towards the end surfaces 80 and 82 of the crossarm member 60 such that the nail projections 112 enter the wood at these end surfaces 80, 82. The nail end plates 62 are displaced until the plate inner surface 120 comes into contact with the end surfaces 80, 82.

With the nail end plates 62 so attached to the crossarm member 60, the first plate edge 130 is adjacent to the crossarm upper surface 70, the second plate edge 132 is adjacent to the crossarm lower surface 72, the third plate edge 134 is adjacent to the crossarm outside surface 76, and the fourth plate edge 136 is adjacent to the crossarm inside surface 74.

The attachment of the nail end plates 62 to the crossarm member 60 provides resistance to movement of wood relative to the plate member 110 in both of two orthogonal directions relative to the plate member 110. The width dimensions of the nail projections 112 inhibit splitting of the wood along the projection axes as defined above. Additionally, the interior angle between the first and second side portions 142 and 144 of the nail projections inhibit splitting of the wood in directions at an angle to the projection axes. The nail end plates 62 thus mechanically engage the crossarm member 60 to inhibit splitting in most if not all radial directions from the center of the crossarm member 60.

Referring for a moment back to FIG. 3, depicted therein are a number of other factors that may be considered when designing nail end plate according to the principles of the present invention. Shown at 180 in FIG. 3 is a first spacing distance between each of the nail projections and the closest plate opening with a collinear hole axis. Reference character 182 identifies a second spacing distance between adjacent nail projections with parallel projection axes. Reference character 184 identifies a minimum spacing distance between nail projections in one array and the closest nail projection in an adjacent array. The minimum spacing distance may vary between different arrays.

In general, the hole projections are arranged such that the nail projections are close enough to each other to stabilize the wood to prevent splitting but not so close that the nail projections themselves do not encourage splitting.

In addition, within a given array rows are defined as nail projections/plate openings with collinear projection axes (rows can contain a single nail projection/plate opening). Within each row having more than one nail projection/plate opening, the nail projections are arranged with the face surfaces of one nail projection facing the back surface of the adjacent nail projection in that row. For two adjacent rows in a given array, the nail projections and tip ends of the plate openings are alternated such that nail projections are offset from one another in the adjacent rows. This pattern spaces out the nail projections such that, within a given array, the nail projections do not enter the wood at closely spaced locations and encourage splitting.

The minimum spacing distance between nail projections in adjacent arrays should be kept as large as possible; when, as between the arrays 170 and 176, the minimum spacing distance between adjacent nail projections is relatively small, the nail projections are oriented such that projection axes are perpendicular to each other. Again, the offset projection axes result in offset penetration into the wood that is less likely to encourage splitting.

Figure 5:
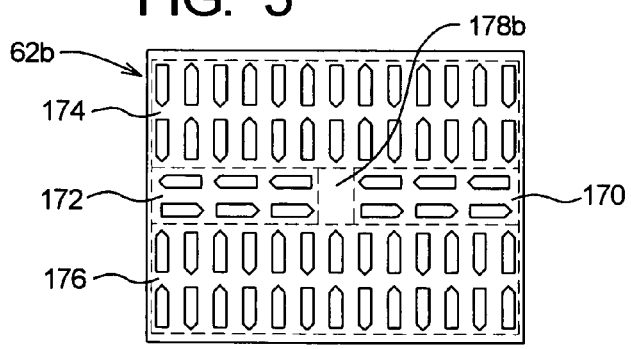
FIG. 5 is a front elevation view of a second embodiment of a nail end plate that may be used by the crossarm system of FIG. 2.

Referring now to FIG. 5, depicted at 62b therein is a second exemplary nail end plate constructed in accordance with, and embodying, the principles of the present invention. The nail end plate 62b is similar in most respects to the nail end plate 62 described above and will only be described herein to the extent that the two nail end plates differ.

Like the nail end plate 62, the nail end plate 62b comprises four arrays 170, 172, 174, and 176 of nail projections, but the number of nail projections in each of these arrays is different for the nail end plate 62b. In particular, the first and second arrays 170 and 172 of the nail end plate 62b each contains six nail projections, while the third and fourth arrays 174 and 176 each contain twenty-six nail projections.

Other configurations of nail projections and arrays are possible. In particular, while the arrays shown in the exemplary nail end plates 62 and 62b are rectangular, other shapes are possible.

The following Table A identifies a number of parameters defined above with reference to the nail end plates 62 of the present invention and sets forth preferred numerical values and first and second preferred numerical ranges for each of these parameters:

TABLE A

| PARAMETER | FIRST PREFERRED EMBODIMENT | FIRST PREFERRED RANGE | SECOND PREFERRED RANGE |
| --- | --- | --- | --- |
| Nail projection height | 0.5" | 0.4"–0.6" | 0.3"–0.75" |
| nail projection width | 0.15" | 0.13"–0.17" | 0.1"–0.25" |
| first spacing distance | 0.15" | 0.13"–0.17" | 0.1"–0.3" |
| second spacing distance | 0.19" | 0.15"–0.24" | 0.1"–0.3" |
| plate member gauge/thickness | 18 gauge | 20 gauge–16 gauge | 22 gauge–14 gauge |
| total number of nail projections | 62 | 38–70 | 12–88 |
| number of nail projections in first and second arrays | 18 | 6–18 | 3–18 |
| number of nail projections in third and fourth arrays | 13 | 13–17 | 3–26 |
| plate member height | 3.5" | 3"–4" | 2.25"–5" |
| plate member width | 4.5" | 4"–5" | 4"–9" |

Given the foregoing, it should be clear that, while the nail end plates 62 are preferred and is particularly suited to use with conventional crossarms, other nail end plates can be constructed that fall within the scope of the present invention. The scope of the present invention should thus be determined with reference to the following claims and not the preferred embodiments described above.

We claim:

1. A method of supporting power lines from a vertical pole, the method comprising the steps of:
   providing a wooden crossarm member defining upper, lower, inner, and outer surfaces and first and second end surfaces;
   providing a crossarm bolt assembly;
   providing a plurality of insulator pin assemblies, where each insulator pin assembly is adapted to support one of the power lines;
   providing at least one brace assembly comprising an upper bracket assembly a lower bracket assembly adapted to be attached to the vertical pole;
   forming a main bore in the crossarm member, where the main bore extends between inner and outer surface and is adapted to receive a crossarm bolt;
   forming a plurality of pin bores in the crossarm member, where the pin bores extend between the upper and lower surfaces and are adapted to receive an insulator pin;
   forming at least one brace bore in the crossarm member;
   providing first and second nail end plates comprising plate member defining an inner surface and an outer surface;
   forming a plurality of nail projections on the plate member such that the nail projections extend from the inner surface of the plate member, and each nail projection defines a width dimension;

displacing the first and second nail end plates towards the first and second end surfaces, respectively, such that the nail projections enter the wooden crossarm member;

extending the crossarm bolt assembly through the main bore to secure the wooden crossarm member to the vertical pole;

extending each insulator pin assembly through one of the pin bores formed in the wooden crossarm member;

securing the upper bracket assembly to the at least one brace bore; wherein the nail projections are arranged such that the width dimensions substantially prevent splitting of the crossarm member caused by loads applied to pin bores of the crossarm member by the power lines through the insulator pin assemblies.

2. A method as recited in claim 1, further comprising the step of arranging the nail projections in a plurality of arrays such that projection axes of the nail projections in each array are parallel with each other.

3. A method as recited in claim 1, further comprising the step of forming the arrays of nail projections such that the projection axes of the nail projections in one of the arrays are perpendicular to the projection axes of the nail projections in another of the arrays.

4. A method as recited in claim 3, further comprising the step of arranging the nail projections in first, second, third, and fourth arrays such that the projection axes of the nail projections in the first and second arrays are parallel to each other;

the projection axes of the nail projections in the third and fourth arrays are parallel to each other;

the first and second arrays are arranged on opposite sides of a gap region where no nail projections are formed; and the second and third arrays are arranged on opposite sides of the gap region.

5. A method as recited in claim 1, in which step of forming the nail projections comprises the step of die-stamping the nail projections.

* * * * *

(12) INTER PARTES REEXAMINATION CERTIFICATE (1217th)
United States Patent
Shields et al.

(10) Number: US 7,007,438 C1
(45) Certificate Issued: Jan. 8, 2016

(54) CROSSARM SYSTEMS AND METHODS

(75) Inventors: Scott D. Shields, Bellingham, WA (US);
John R. Ferlin, Bellingham, WA (US);
John L. Clark, Ferndale, WA (US)

(73) Assignee: Brooks Manufacturing Co.

Reexamination Request:
No. 95/002,191, Sep. 12, 2012

Reexamination Certificate for:
Patent No.: 7,007,438
Issued: Mar. 7, 2006
Appl. No.: 10/254,412
Filed: Sep. 24, 2002

(51) Int. Cl.
*E04C 3/14* (2006.01)
*G01K 17/16* (2006.01)

(52) U.S. Cl.
CPC ..................................... *G01K 17/16* (2013.01)

(58) Field of Classification Search
USPC ............... 52/745.19, 712; 403/283; 29/897.3, 29/897–31
See application file for complete search history.

(56) References Cited

To view the complete listing of prior art documents cited during the proceeding for Reexamination Control Number 95/002,191, please refer to the USPTO's public Patent Application Information Retrieval (PAIR) system under the Display References tab.

*Primary Examiner* — Matthew C Graham

(57) ABSTRACT

A crossarm system adapted to support power lines from a vertical pole. The crossarm system comprises a wooden crossarm member and first and second nail end plates. The wooden crossarm member defines upper, lower, inner, and outer surfaces and first and second end surfaces, a main bore, a plurality of pin bores, and at least one brace bore. Each nail end plate comprises a plate member defining an inner surface and an outer surface and a plurality of nail projections extending from the inner surface of the plate member. Each nail projection defines a width dimension. In use, the first and second nail end plates are displaced towards the first and second end surfaces, respectively, such that the nail projections enter the wooden crossarm member. The nail projections are arranged such that the width dimensions substantially prevent splitting of the ends of the crossarm member.

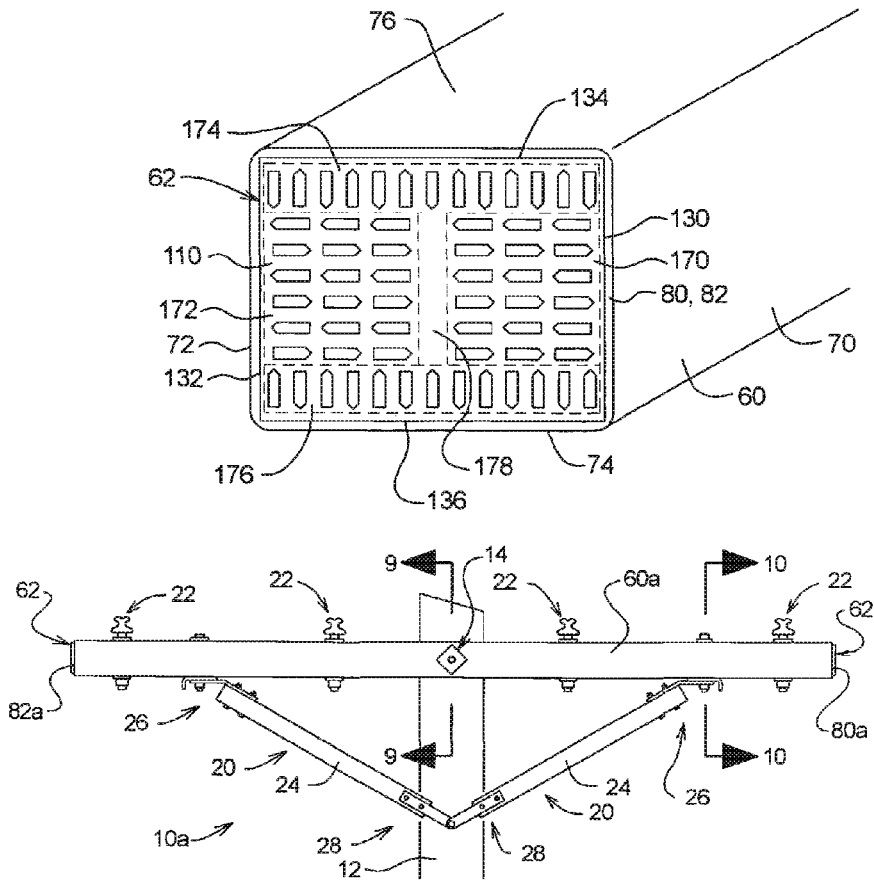

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-5 are cancelled.

* * * * *